(12) United States Patent
Woeste et al.

(10) Patent No.: US 11,139,538 B2
(45) Date of Patent: Oct. 5, 2021

(54) BATTERY MODULE

(71) Applicant: Aptiv Technologies Limited, St. Michael (BB)

(72) Inventors: Guido Woeste, Schwelm (DE); Olaf Patz, Wohltorf (DE)

(73) Assignee: APTIV TECHNOLOGIES LIMITED

( * ) Notice: Subject to any disclaimer, the term of this patent is extended or adjusted under 35 U.S.C. 154(b) by 149 days.

(21) Appl. No.: 16/686,279

(22) Filed: Nov. 18, 2019

(65) Prior Publication Data
US 2020/0168881 A1 May 28, 2020

(30) Foreign Application Priority Data
Nov. 26, 2018 (EP) .................................... 18208345

(51) Int. Cl.
| | |
|---|---|
| H01M 50/502 | (2021.01) |
| H01M 10/42 | (2006.01) |
| H01M 10/48 | (2006.01) |
| H02J 7/00 | (2006.01) |
| H01M 50/20 | (2021.01) |

(52) U.S. Cl.
CPC ..... *H01M 50/502* (2021.01); *H01M 10/4257* (2013.01); *H01M 10/482* (2013.01); *H01M 50/20* (2021.01); *H02J 7/0014* (2013.01); *H02J 7/0021* (2013.01); *H01M 2010/4271* (2013.01); *H01M 2010/4278* (2013.01); *H01M 2220/20* (2013.01)

(58) Field of Classification Search
USPC ....................................................... 320/118
See application file for complete search history.

(56) References Cited

U.S. PATENT DOCUMENTS

| | | | |
|---|---|---|---|
| 2011/0135970 A1* | 6/2011 | Han ..................... | H01M 50/502 429/7 |
| 2016/0193939 A1* | 7/2016 | Smidebrant ............ | B60L 50/16 701/22 |
| 2016/0241058 A1* | 8/2016 | Carralero ................ | H02J 7/007 |
| 2016/0336767 A1* | 11/2016 | Zane ..................... | H02J 7/0068 |
| 2016/0372801 A1* | 12/2016 | Clemente ............. | H01M 50/20 |
| 2020/0207219 A1* | 7/2020 | Slepchenkov .......... | B60L 58/18 |

FOREIGN PATENT DOCUMENTS

DE 102014209273 A1 11/2015

* cited by examiner

*Primary Examiner* — Mohammed Alam
(74) *Attorney, Agent, or Firm* — Billion & Armitage

(57) ABSTRACT

A battery module including a plurality of battery cells and a cell balancing system having a respective battery cell monitoring module attached to each battery cell and a module carrier having second connection means for connection of a positive terminal of the battery cell to a negative terminal of an adjacent battery cell and for an electrical connection of a negative terminal of the battery cell to a positive terminal of another adjacent battery cell. The battery cell monitoring modules are connected to one another by a balancing bus for transmitting data and electrical current. The electronic battery cell monitoring modules are connected to the positive and negative terminals of the battery cell. The module carrier has two electrical lines and an energy storage module for storing electrical energy. The energy storage module is connected to the two electrical lines to take up or output electrical energy over them.

14 Claims, 9 Drawing Sheets

BATTERY MODULE

CROSS-REFERENCE TO RELATED APPLICATION

This application claims the benefit under 35 U.S.C. § 119(a) of Patent Application No. 18208345.1 filed in the European Patent Office on Nov. 26, 2018, the entire disclosure of which is hereby incorporated by reference.

TECHNICAL FIELD OF THE INVENTION

The invention relates to a battery module for high voltage battery packs for use in vehicles and to a method of assembling said battery module.

BACKGROUND OF THE INVENTION

Currently lithium-based rechargeable battery cells (respectively simply battery cells) are used, inter alia, for electromobility, in particular in the automotive sector, as the basis for battery modules and such are used as the basis for high voltage battery packs. Rechargeable battery modules are known that are interconnected from a plurality of individual battery cells connected in series or battery cell blocks connected in parallel. Such battery modules are also connected in series and in parallel to form high voltage battery packs. Large-format cells, so-called "prismatic cells" are preferably used here. They are typically first mechanically connected to form groups, so-called modules, and are placed in housings. Electrical current bridges, so-called cell connectors, are then mounted at the cell terminals are fixedly connected to the cell terminals by welding. The cells are mechanically connected to one another by the welding. These battery modules are then typically mounted with electronic units that are given a large number of line connections to all the individual cells and cell terminals. These modules are in turn interconnected with further modules to form battery packs and are given a high ranking electronic unit having a corresponding wiring system that is then connected to the central electronics of a vehicle that take over the energy management of the total high voltage battery pack. It would be desirable in view of constantly increasing demands on the current load capacity, on the reduction of power loss, and on the necessity of reuse after a "first life" in a vehicle to simply be able to dismantle such battery packs back into individual battery cells, to then sort the separate battery cells by their characteristic data, and to assemble equivalent battery cells to new battery modules or packs. The assembly, the dismantling, and the sorting of the battery cells should be able to take place fully automatically by machines to keep the assembly costs low.

The object of the invention can be seen in providing a battery module for high voltage battery packs in which the battery cells can be replaced fast and wherein the functional capability of the battery module is only interrupted by the process of replacement.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

In particular by a battery module for high voltage battery packs, preferably for use in vehicles. The battery module comprises a plurality of battery cells and a cell balancing system to balance the charge of the individual battery cells. The cell balancing system comprises a respective one electronic battery cell monitoring module attached to each of the battery cells. The battery cell monitoring modules are connected to one another, releasably by means of first connection means, by a balancing bus to transmit data and electric current. The electronic battery cell monitoring modules are electrically connected to a positive terminal and to a negative terminal of the battery cell. A module carrier for receiving and holding the plurality of battery cells. The module carrier comprises second connection means for the electrical connection of a positive terminal of the battery cell to the negative terminal of an adjacent battery cell and for the electrical connection of a negative terminal of the battery cell to the positive terminal of an adjacent battery cell. The module carrier comprises the balancing bus that has at least two electrical lines. The module carrier comprises an energy storage module for storing electrical energy. The energy storage module is electrically connected to the two electrical lines of the balancing bus to take up or output electrical energy over them.

To make the battery cells quickly replaceable, contact systems that require tools to connect or release the high current contacts and fixed connections such as weld connections should be avoided. A pluggable contacting system is therefore required. The high current wiring system is completely integrated in the module carrier, whereby additional wiring effort is superfluous. In this respect, the high current contact of the battery contacts by plug-in contacts is simplified, with the contact resistance values of the contact system used being negligibly small. The contact system must be able together with the housing mounts to compensate mechanical tolerances that may occur in assembly or in operation. The balancing bus is also completely integrated in the module carrier, whereby additional wiring effort is superfluous. The contact of the balancing bus is not critical since only smaller voltages and currents are active here. Since the energy storage module is also integrally installed in the module carrier, a defective module carrier can be replaced fast and without problem, which increases service friendliness and lowers costs. To provide a functional and powerful battery module after the replacement, all the battery cells have to have a comparable charge state. There is the problem on a serial connection of rechargeable batteries that as the number of charge and discharge cycles increases, the rechargeable battery capacities of the cells drift apart and the total capacity of a pack is thus continuously reduced oriented on the weakest cell. It is already prior art to balance the charge between the cell levels to avoid such a behavior. This is typically done passively on charging by an electronically controlled switching in of resistance values to the cells that have already reached a high level of charge to thus lead the current for charging the other cells past this "full cell". So-called active balancing is furthermore used to reduce the losses arising in the passive method. In this respect, charge portions are electronically withdrawn from cells with higher charge and released again to cells of lower charge. This is typically implemented by a central, common electronic unit. Central electronic systems monitor and balance a fixed cell grouping. In this respect, energy portions are removed from individual cells, are buffered via voltage converters, and are then released to other individual cells again. A complex wiring is required here that merges the voltage taps and temperature sensor signals centrally on the electronics. After a dismantling into individual cells, where possible, all the data on the individual cells are no longer available. The cells then have to be laboriously individually characterized so that they can be reassembled in a manner identified as equivalents. The balancing of the individual battery cells is effected by the intelligent cell balancing system with the aid of the energy storage module.

The method of assembly of a battery pack comprises the steps:
a) Providing a plurality of battery cells, with the plurality of battery cells being preselected according to their characteristic data, comprising a respective one electronic battery cell monitoring module attached to each of the battery cells, with the electronic battery cell monitoring modules being electrically connected to a positive terminal and to a negative terminal of the battery cell, with the battery cell monitoring modules being connectable to one another, releasably by means of first connection means, by a balancing bus for transmitting data and electric current;
b) Providing a module carrier for receiving and holding the plurality of battery cells, with the module carrier comprising second connection means for electrically connecting a positive terminal of the battery cell to the negative terminal of an adjacent battery cell and for electrically connecting a negative terminal of the battery cell to the positive terminal of an adjacent battery cell, with the module carrier comprising the balancing bus that has at least two electrical lines, with the module carrier comprising an energy storage module for storing electrical energy, and with the energy storage module being electrically connected to the two electrical lines of the balancing bus to take up or output electrical energy over them;
c) Plugging the plurality of battery cells into the module carrier, whereby the connection of the battery cell monitoring modules to one another and to the energy storage module is established via the balancing bus and the connections of the battery cells to the second connection means.

The preselection of the battery cells is carried out in a newly composed battery module before the assembly and is entered in a database. The manufacturer combines the battery cells such that battery cells having almost identical characteristic data are compiled. This measure should have the effect that the battery mode demonstrates optimum performance because all the battery cells can be uniformly depleted. If a battery cell has to be replaced due to a defect during the service life of the battery module, the characteristic data of the remaining battery cells are read and evaluated. A replacement battery cell is looked for in the battery cell database that matches the already present battery cells and their characteristic data. The new battery module accordingly then again has a set of battery cells that can be uniformly depleted.

Advantageous embodiments of the invention can be seen from the dependent claims, from the description, and from the drawings.

The second connection means is preferably an electrical connector element that is produced as a stamped part from a metal sheet and has at least one freely projecting tongue that is bent out of the sheet metal plane on a first side of the sheet metal and extends in a plane in parallel with the sheet metal plane. The connector element has two fingers that project freely in the plug-in direction of the connector element and that extend in parallel with at least one freely projecting tongue in the sheet metal plane. The two freely projecting fingers form the front end of the connector element in the plug-in direction. The two fingers projecting freely in the plug-in direction of the connector element thus define a gap between them open at the front end of the connector element, said gap being covered by the freely projecting tongue bent out of the sheet metal plane. On the plugging together of two connector elements to be connected to one another, the fingers of a connector element or the gap formed by them serve/serves as a guide for the tongue of the respective other connector element, whereby an exactly fitting seat of two connector elements to be connected can be ensured. Since the two freely projecting fingers extend, like the freely projecting tongue, in the plug-in direction of the connector element and in so doing form the front end thereof, two identical connector elements rotated by 180° with respect to one another can be brought into engagement with one another with the free ends of the freely projecting fingers facing forward by a linear plug-in movement, which has the consequence that the metal sheet from which the respective connector element is stamped is clamped tight by friction locking between the two fingers and the freely projecting tongue of the respective other connector element. This contact element has already been registered as a patent under the number EP 2 551 963. The contact element is simple to manufacture and can also be used with a simple bus bar in the form of an elongate strip of sheet metal. With a part of the bus bar being clamped between the fingers and the tongue. On an expansion of the contact element caused by heating, the contact element can move in relation to the bus bar to compensate mechanical tolerances, with the contact forces then increasing.

The second connection means preferably comprises a plurality of terminal contact elements. Each terminal contact element comprises an electrical connector element, wherein a contact strip of the sheet metal extends from the two freely projecting fingers, at the front end, at a right angle to the plug-in direction, against the first side. A terminal contact element is here attached to the positive terminal of a battery cell and a second terminal contact element is attached to the negative terminal of a battery cell. The terminal contact elements are oriented in the plug-in direction. Due to the embodiment of a side of the terminal contact elements in the form of the connector elements, the battery cell can be very easily connected to the bus bar or to identically shaped connector elements. No tools are required for the assembly or dismantling and they can be carried out multiple times alternately. The other side of the terminal contact element can be non-releasably connected to the battery terminal by means of the contact strip. This can be effected by welding.

The battery module preferably comprises a plurality of bus bars, with each bus bar having a connector element at a first end and having a second connector element at its second end, with the bus bar extending at a right angle to the plug-in direction. A serial connection of the battery cells can be easily implemented by the arrangement of the connector elements of battery terminals and bus bars. The contact resistance of the bus bars is very small between the connector elements since the bus bar, including the connector elements, is designed in one part and no additional contact resistance values have to be considered.

The electrical connector elements of the terminal contact elements and the electrical connector elements of the bus bars are preferably aligned with respect to one another and along the plug-in axis such that they slide into one another and establish electrical contact on a correct alignment of the battery cell on a movement toward one another. This design enables a self-locating contact process.

The electrical connector elements of the terminal contact elements and the electrical connector elements of the bus bars are preferably aligned with respect to one another and along the plug-in axis such that they do not slide into one another and do not establish any electrical contact on an incorrect alignment of the battery cell on a movement toward one another. This design of the connector elements makes it possible to provide codes to prevent the incorrect battery terminal from being connected to the bus bar.

It is also conceivable to position the connector elements at the bus bar asymmetrically to the center of the elongate bus bar. If the bus bar is then arranged accordingly in the module carrier, the battery terminals of an incorrectly inserted battery cell cannot locate any counter terminal in the bus bar. This avoids unwanted short circuits or terminal reversals that could destroy the whole battery module. The material thickness and the width of the connector elements can be varied to change the current load capacity.

A first terminal contact element attached to a first battery terminal, a battery cell, preferably has an extension at a right angle to the plug-in direction that differs from the extent of a second terminal contact element that is attached to the second battery terminal. It is thereby prevented that only contact parts geometrically coordinated with one another can come into engagement with one another, whereby terminal reversals are avoided.

The second connection means preferably comprises a plurality of bridge contact elements. Each bridge contact element comprises two of the electrical connector elements. The electrical connector elements are arranged in parallel with one another, with the first sides of the electrical connector elements facing in opposite directions. The electrical connector elements are connected by a piece of the metal sheet. These bridge contact elements enable a connection design with an alternative cell arrangement.

The module carrier preferably has a plurality of cutouts that are configured to receive and to hold the plurality of battery cells, with each cutout extending from an opening along the plug-in direction, with the plurality of bus bars being arranged opposite the openings. The battery terminals of the battery cells that are pushed into the cutouts are only contacted when the battery cell is held to a larger part in the cutout. This increases the safety against damage to the battery terminals. The battery cell is furthermore mechanically guided in the cutout, whereby the battery terminals are already properly aligned before the contact with the bus bars. A cell carrier can also be provided as a sub-housing to receive and mechanically stabilize the cells, with the described module carrier system then being mounted from above as a cover and with thus all the electrical connections being established and the module closed in one step.

The first connection means preferably comprises a self-locating plug-in system to connect the balancing bus to the electronic battery cell monitoring modules and to the energy storage module. These plug-in systems are already used in the blind assembly of electrical plugs. These plug-in systems use funnel-like structures and corresponding mounts that enable a corresponding sideways movement to guide the plugs along the plug-in path with respect to one another and to enable a plugging together. Contacts at the side walls of the battery cell could also be provided instead of the described plug-in system. The contacts that are attached to the boundary walls that surround the cutout then contact laterally. After the plugging of the battery cells into the cutouts, the contacts of the battery cells could contact the contacts at the boundary walls. A large number of further possibilities are conceivable to design the contact of the balancing bus.

The energy storage module is preferably formed in one part with the module carrier. The energy storage module is integrated in the module carrier in a mechanically and electrically protected manner by this design. The costs for the energy storage module can be reduced since no separate housing or plug-in connections are required.

The electronic battery cell monitoring modules preferably have a first electrical switch and a second electrical switch. The electrical switches are configured to electrically connect the battery cells to a respective one of the two electrical lines of the balancing bus. The electronic battery cell monitoring modules and the energy storage module are connected to one another by the balancing bus and thereby form a cell balancing system.

The electronic battery cell monitoring modules and the battery cells used are substantially of the same construction. The electronic components used in the battery cell monitoring modules should be identical or technically comparable in all battery cell monitoring modules. A smooth running of the control programs that control the battery cell monitoring modules is thereby ensured. The control programs that are used for the control of the battery cell monitoring modules are likewise identical. The electronic battery cell monitoring modules that are each fixedly connected to a battery cell continuously detect the characteristic values of the battery cell. The characteristic values of the battery cell are at least the electrical voltage between the battery terminals and the temperature of the battery cell. The battery cell monitoring modules further detect the electrical voltage between the at least two electrical lines and can thereby evaluate the charge state of the electrical energy storage module. The electronic battery cell monitoring modules have the ability to communicate with one another via the balancing bus, with a network in accordance with the known multi-master system being able to be used. The electronic battery cell monitoring modules communicate with one another and compare the voltage values of their own battery cells with the voltage values of the other battery cells. After a consensus of all the electronic battery cell monitoring modules has been formed, a battery cell that has the highest electrical voltage connects together with an adjacent battery cell to the two electrical lines of the balancing bus and conducts electrical energy over them from the battery cells into the electrical energy store and disconnects from the two electrical lines again. A battery cell that has too low an electrical voltage then connects to the two electrical lines of the balancing bus and conducts electrical energy over them from the electrical energy store into the battery cell and disconnects from the two electrical lines again. This procedure carries on continuously. The energy storage module can comprise a capacitor, an electric coil, or a combination of a capacitor and an electric coil to store electrical energy.

A method of adapting the charge of the individual battery cells of a battery module to a predefined level can comprise the following steps:

a) Providing a battery module comprising a plurality of battery cells comprising a respective electronic battery cell monitoring module attached to each of the battery cells, with the battery cell monitoring modules being connected to one another by a balancing bus comprising at least two electrical lines for transmitting data and electrical current, with the electronic battery cell monitoring modules being electrically connected to a positive terminal and to a negative terminal of the battery cell, with the electronic battery cell monitoring modules having a first electrical switch and a second electrical switch, with the electrical switches being configured to electrically contact the battery cells to a respective one of the two electrical lines of the balancing bus, with the battery module comprising an energy storage module for storing electrical energy, with the energy storage module being electrically connected to the two electrical lines of the balancing bus to take up or output electrical energy over them, and with the electronic battery cell monitoring modules and the energy storage module connected to one another by the balancing bus forming a cell balancing system;

b) Connecting the positive terminal of the battery cell to the negative terminal of the adjacent battery cell and connecting the negative terminal of the battery cell to the positive terminal of the adjacent battery cell such that a serial connection of all the battery cells is produced, with a positive terminal and a negative terminal of the serial connection not being connected to one another;

c) Starting the communication of all the connected battery cell control modules over the balancing bus;

d) Identifying all the battery cell monitoring modules;

e) Determining the arrangement of the battery cells in the battery module;

f) Swapping all the charge states of the battery cells over the balancing bus;

g) Taking over of control by the battery cell monitoring module having the highest transmitted charge voltage;

h) Switching off two battery cells connected in series by the respective positive terminal of the one cell and the negative terminal of the other cell, with one of the cells being the cell with the highest cell voltage and the second cell disposed in series having the comparatively higher cell voltage of these two cells disposed in series;

i)) Charging the electrical energy store;

j) Disconnecting the battery cells from the balancing bus;

k) Switching the positive terminal and the negative terminal of the battery cells having the lowest charge voltage to the balancing bus;

l) Charging the battery cell with the energy of the electrical energy store;

m) Disconnecting the battery cells from the balancing bus; and n) Continuing with method step f).

The electronic battery cell monitoring modules are configured as multi-master systems so that the battery cells in the assembly can carry out the active balancing without external initialization. Each battery cell monitoring module transmits its charge state cyclically. They are buffered in each battery cell monitoring module. The battery cell monitoring module that has the highest charge state in the assembly could then be responsible for the control of the next balancing cycle. The cycle includes the determination of the two adjacent battery cells having the higher charge state. The brief switching of the two battery cells in series to the balancing bus for the charge discharge to the energy storage module is initiated by means of a control command. A further control command will then initiate the brief switching of the weakest battery cell for the charge removal from the energy storage module. The battery cell monitoring module of the weakest battery cell here takes over the monitoring of the charge cycle and the disconnection from the balancing bus. After the next charge state determination, the next balancing cycle is then carried out as described above.

Each of the electronic battery cell monitoring modules can connect the positive terminal of the battery cell by means of the first electrical switch to one of the electrical lines of the balancing bus and the negative terminal of the battery cell by means of the second electrical switch to the other electrical line of the balancing bus independently of the further electronic battery cell monitoring modules. Each of the electronic battery cell monitoring modules has electrical switches that are individually switchable. The design of the switches as semiconductor components makes it possible to implement high switching frequencies and simultaneously to ensure a long service life. Each of the electronic battery cell monitoring modules can connect the positive terminal of the battery cell by means of the first electrical switch to one of the electrical lines of the balancing bus and another battery cell monitoring module can connect the negative terminal of the battery cell by means of the second electrical switch to the other electrical line of the balancing bus independently of the further electronic battery cell monitoring module, with this also being able to take place in reverse order and polarity depending on the order of the cells. The battery cells are each electrically connected to the negative terminal and to the positive terminal of the respective adjacent battery cell in a serial connection to achieve a higher total voltage of the battery module. It is, for example, possible by the independent switching possibility of the electrical switches to switch the positive terminal of a battery cell to one of the two electrical lines and to switch the negative terminal of the adjacent battery cell to the second one of the two electrical lines. The electrical energy store can be given a higher charge by the doubled voltage that is now applied between the two electrical lines. In combination with short switching times, a plurality of battery cells can be charged after one another with one charge of the electrical store without having to charge the electrical energy store in the meantime. The battery cell monitoring module has at least one electrical data port that is capacitively connected to one of the electrical lines of the balancing bus, with control signals being transmitted to the data port by modulation on this electrical line. An additional signal line can be dispensed with by the modulation on one of the electrical lines. The data transmission can alternatively be carried out when the battery cell monitoring module has at least one optical data port and the balancing bus has an optical line, with the data port being optically connected to the optical line of the balancing bus. The control signals are transmitted by modulation of light on the corresponding optical line. In automotive engineering, the use of optical lines has proven itself in environments contaminated especially highly electromagnetically to avoid interference in the data transmission. The data transmission can furthermore be carried out over electrical lines. The battery cell monitoring module has at least one electrical data port that is designed in a two-terminal manner. The balancing bus comprises two electrical data lines that are connected to the two-terminal electrical data port. A respective data line is connected to one electrical data port. The control signals are transmitted by modulation on the two electrical data lines. Depending on the required data transmission rate, two electrical wires can also simply be used as the data line. These wires are preferably twisted with one another to minimize interference. The electronic battery cell monitoring modules are programmable and comprise at least one microprocessor module that has a store, input/output ports, temperature measurement means and voltage measurement means, with the electronic battery cell monitoring modules having a basic communication function for communication with the other battery cell monitoring modules by means of the balancing bus. Microprocessor modules having the above-named properties have long been used in industry and can be purchased inexpensively. A large number of these microprocessor modules have an implemented communication function with different transmission protocols and methods used in the industry. This communication function reduces the development effort in the programming. Such microprocessor modules furthermore predominantly have an energy-saving function that reduces the power consumption to a minimum. The battery cell monitoring module can additionally comprise transmission means that transforms the electrical energy of the electrical energy store into electrical voltage having an adjustable level and applies it at the battery terminals. The electronic battery cell monitoring module is formed in one part with the battery cell, whereby an autonomous battery element is produced. The electronic battery cell monitoring module is relatively small in relation to the battery cell and can be adhesively bonded to the battery cell. An integration in the housing of the battery cell is also conceivable, which is reflected in increased protection against damage to the electronic battery cell monitoring module. The battery cells of the battery module can be balanced during operation as an energy supply and in times at which the battery module is not connected either to an energy supply or to a consumer. The battery module thereby retains its full function even if it is stored temporarily as a spare part. A total discharge of a battery cell is largely prevented since all the battery cells are kept at a similar voltage level. To prevent a total discharge of the total battery module, a signal apparatus can be provided at the current connectors of the battery module that signals a total discharge that signals that the total voltage of the battery module is too low. The electronic battery cell monitoring modules each have a unique identifier, e.g. according to the UUID standard, with this identifier being indelibly implemented in the battery cell monitoring modules and being able to be invoked via the balancing bus. This unique identifier can, for example, be stored in an EPROM on the battery cell monitoring module. A universally unique identifier (UUID) is a standard for identification that is used in software development. It was standardized by the Open Software Foundation (OSF) as part of the Distributed Computing Environment (DCE). It is the purpose of UUIDs to be able to clearly mark information in distributed systems without any central coordination. A UUID consists of a 16-byte number that is written in hexadecimal notation and is divided into five groups. The electronic battery cell monitoring modules store the identification data of the corresponding battery cell in updated form over the service life of the battery cell. Information on the number of charge and discharge cycles and further characteristic data of the battery cell are continuously stored and can be invoked via the balancing bus. For example, a service unit could be connected to the balancing bus or directly to an electronic battery cell monitoring module to view or download these data. It is possible by using these data to make a prediction on the further use capability of the battery cell and to replace it as required.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
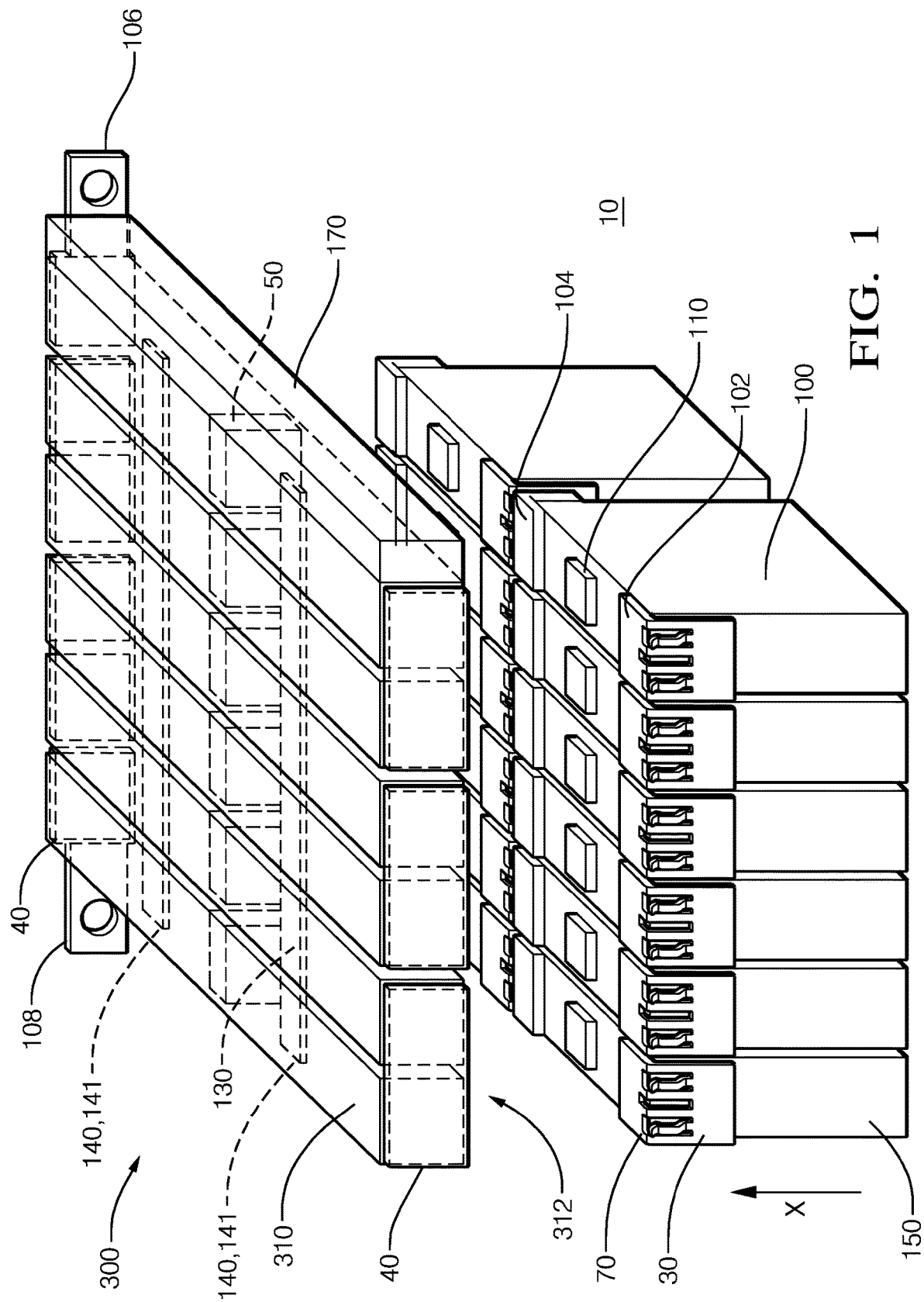
FIG. 1 shows a perspective representation of the battery module with a module carrier suspended above it.

FIG. 1 shows a perspective representation of the battery module 10 having a module carrier 300 suspended above it; The battery module 10 comprises a plurality of battery cells 100. A respective six battery cells are arranged in two rows in this representation. The battery module shown comprises two rows having six battery cells each that are connected in series. A cell balancing system for balancing the charges of the individual battery cells 100 comprising a respective electronic battery cell monitoring module 110 attached to each of the battery cells 100. The battery cell monitoring modules 110 can be connected to one another, releasably by means of first connection means, by a balancing bus 130 to transmit data and electric current. A module carrier 300 for receiving and holding the plurality of battery cells 100. The module carrier 300 comprises second connection means for the electrical connection of a positive terminal 102 of the battery cell 100 to the negative terminal 104 of an adjacent battery cell 100 and for the electrical connection of a negative terminal 104 of the battery cell 100 to the positive terminal 102 of an adjacent battery cell 100. The module carrier 300 comprises the balancing bus 130 that has at least two electrical lines 140, 141. The module carrier 300 comprises an energy storage module 170 for storing electrical energy. The energy storage module 170 is electrically connectable to the two electrical lines 140, 141 of the balancing bus 130 to take up or output electrical energy over them. The energy storage module 170 is formed in one part with the module carrier 300. The module carrier 300 has a plurality of cutouts 310 that are configured to receive and hold the plurality of battery cells 100, with each cutout 310 extending from an opening 312 along the plug-in direction X. The battery module 10 comprises a plurality of bus bars 40, with the plurality of bus bars 40 being arranged at the narrow ends of the openings 312. The battery module 10 comprises a plurality of bridge contact elements 50, with the plurality of bridge contact elements 50 being arranged in the module carrier 300 such that they can connect battery cells 100 disposed in different rows. The first connection means comprises a self-locating plug-in system to connect the balancing bus 130 to the electronic battery cell monitoring modules 110 and to the energy storage module 170. The positive terminal 102 of the battery cell 100 is formed by a terminal contact element 70 having a connector element 30 that is oriented in the plug-in direction X. The negative terminal 104 of the battery cell 100 is formed by a terminal contact element 70 having a connector element 30 that is oriented in the plug-in direction X.

Figure 2:
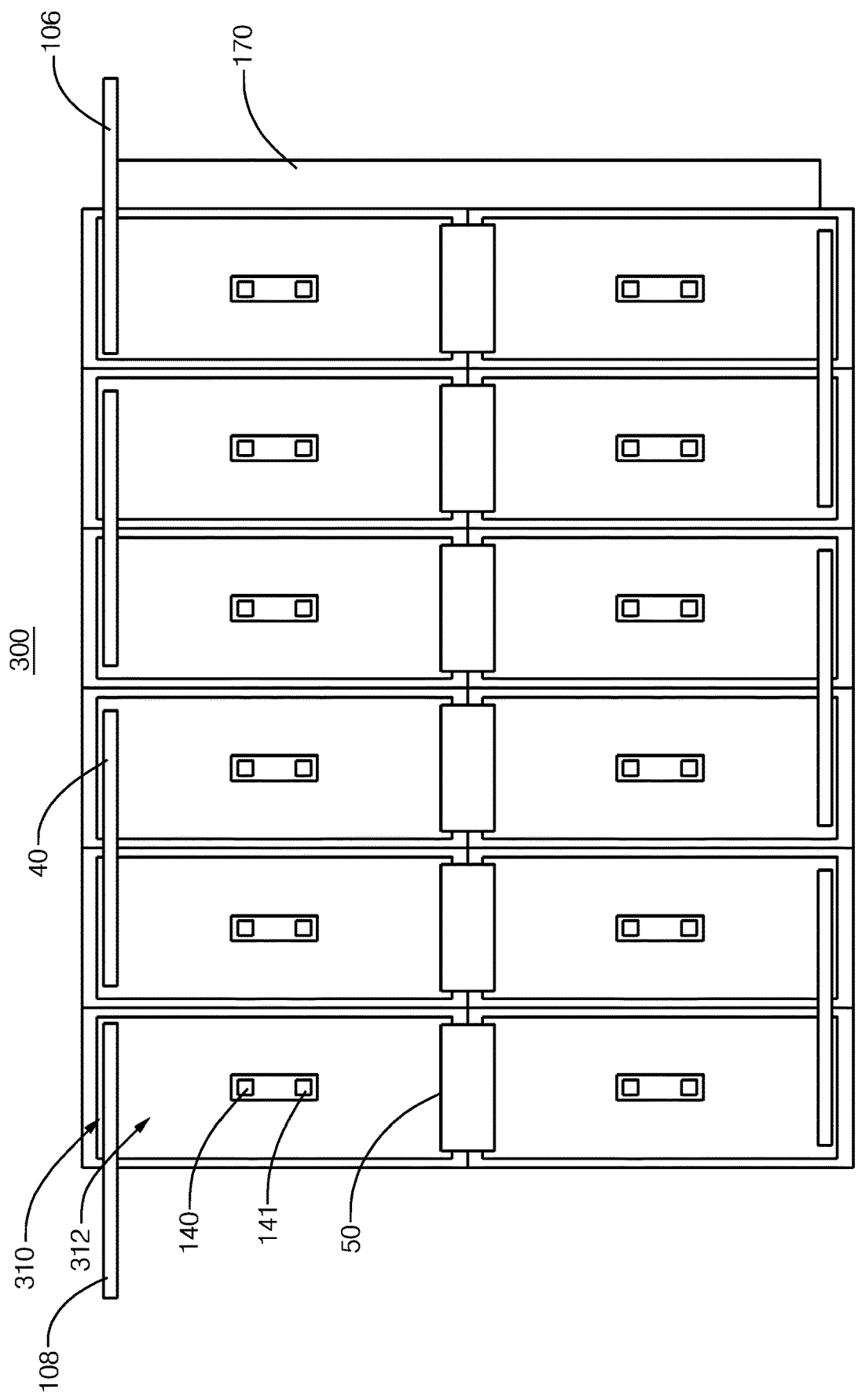
FIG. 2 shows a representation of the module carrier.

FIG. 2 shows a representation of the module carrier 300, with the view being selected such that the observer looks into the cutouts 310. The bus bars 40 can be seen at the sides of the cutouts 310. Bus bars 40 bent by 180 degrees are located centrally with the cutouts 310. Connection means for contacting the two electrical lines 140, 141 of the balancing bus 130 are provided at the surfaces opposite the openings 312. Connector terminals 106, 108 project out of openings 312 that are provided for battery cells 100 that each form the first and last battery cells of the serial connection to make the battery module 10 connectable to an electronic device or to further modules. The energy storage module 170 is integrated in the module carrier 300 and the wiring of the balancing bus 130. If the battery cells 100 are plugged into the cutouts, they are automatically connected to the bus bars and to the balancing bus 130 and the balancing cycle starts.

Figure 3:
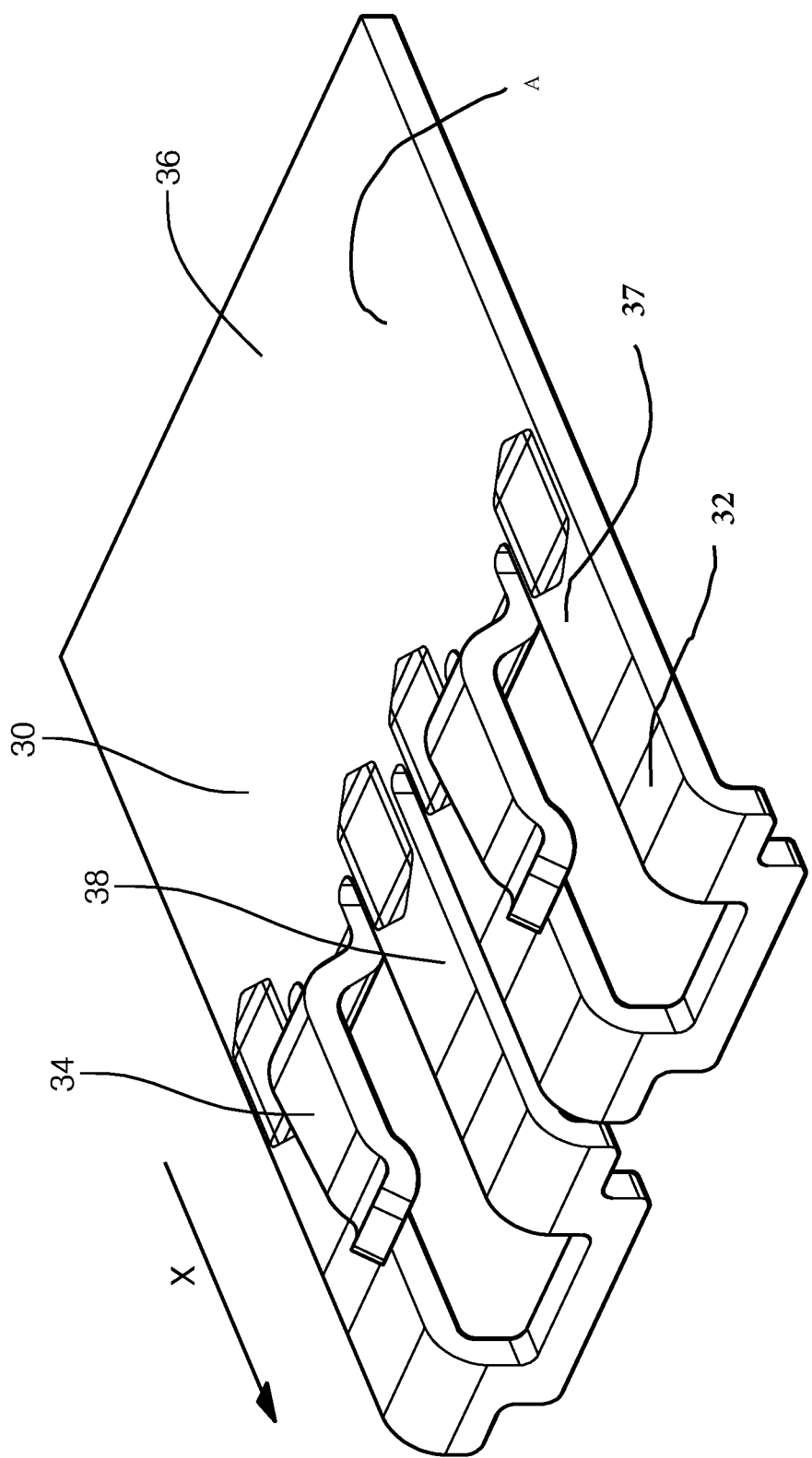
FIG. 3 shows a perspective representation of a connector element.

FIG. 3 shows a perspective representation of the connector element 30. The second connection means comprises the electrical connector element 30 that is produced as a stamped part from sheet metal 36 and has at least one freely projecting tongue 34 that is bent out of the sheet metal plane on a first side A of the sheet metal 36 and extends in a plane in parallel with the sheet metal plane. The connector element 30 has two fingers 37 that project freely in the plug-in direction X of the connector element 30 and that extend in parallel with the at least one freely projecting tongue 34 in the sheet metal plane. The two freely projecting fingers 37, 38 form the front end 32 of the connector element 30 in the plug-in direction.

Figure 4:
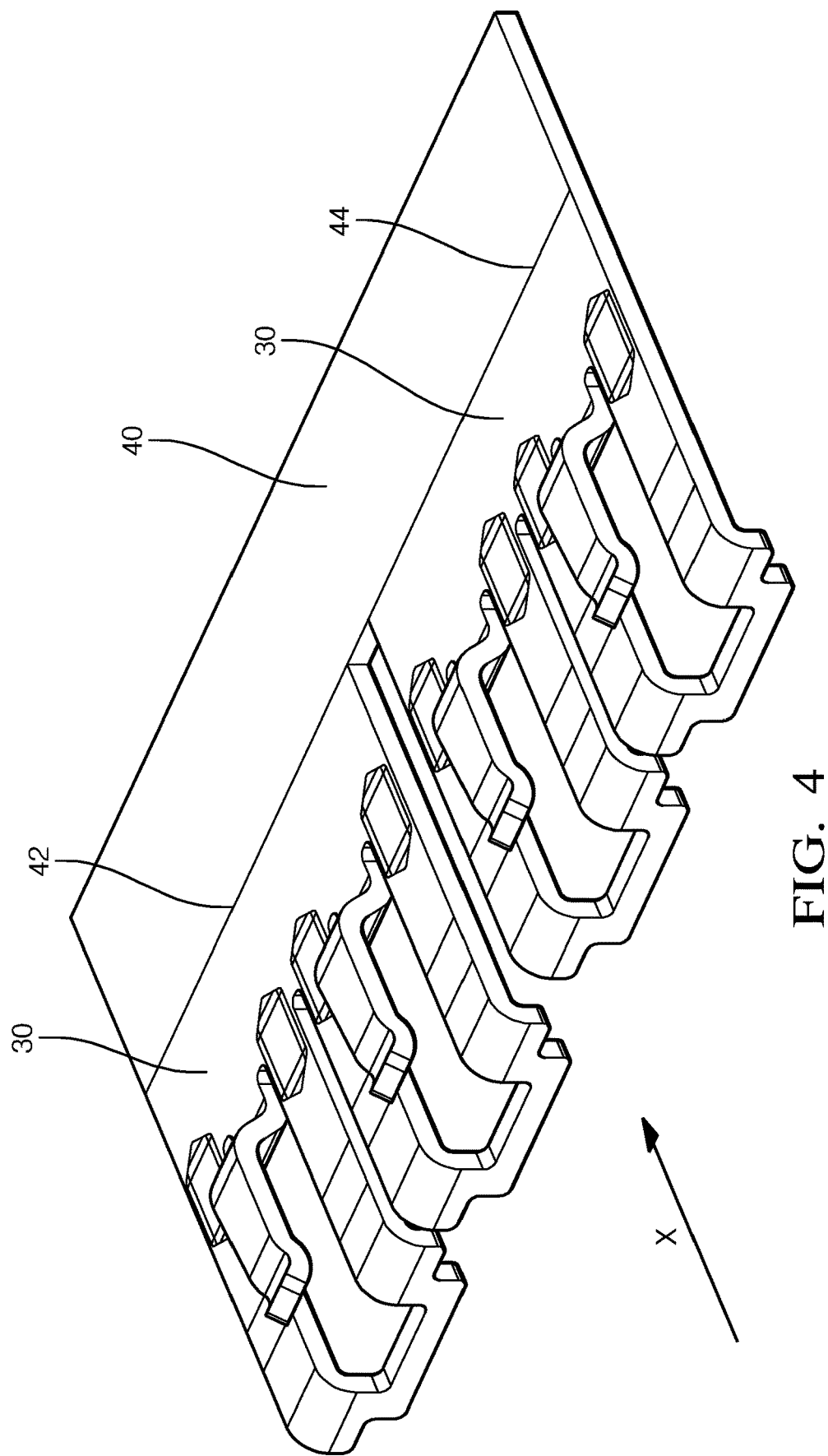
FIG. 4 shows a perspective representation of a bus bar.

FIG. 4 shows a perspective representation of a bus bar 40. Each bus bar 40 has a connector element 30 at its first end 42 that is oriented against the plug-in direction X. Each bus bar 40 has a connector element 30 at its second end 44 that is oriented against the plug-in direction X. The positive terminal 102 can thereby be releasably connected to the first end 42 of a bus bar 40. The negative terminal 104 can be connected along the plug-in direction X to the second end 44 of a bus bar 40.

Figure 5:
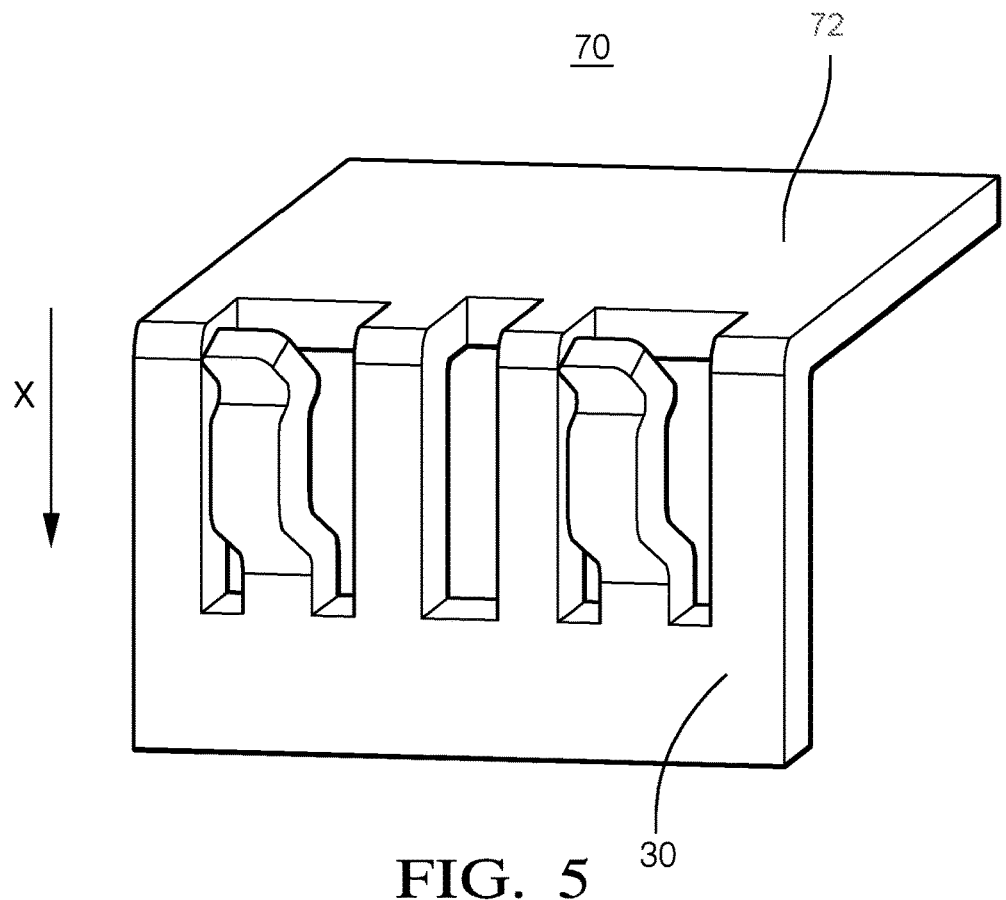
FIG. 5 shows a perspective representation of a terminal contact element.

FIG. 5 shows a perspective representation of a terminal contact element 70 for fixed attachment to a positive terminal 102 of the battery cell 100 or to a negative terminal 104 of a battery cell 100 with the aid of a contact strip 72 that extends angled to the plug-in direction. The terminal contact element 70 likewise comprises a connector element 30 for releasable connection to a counter-piece.

Figure 6:
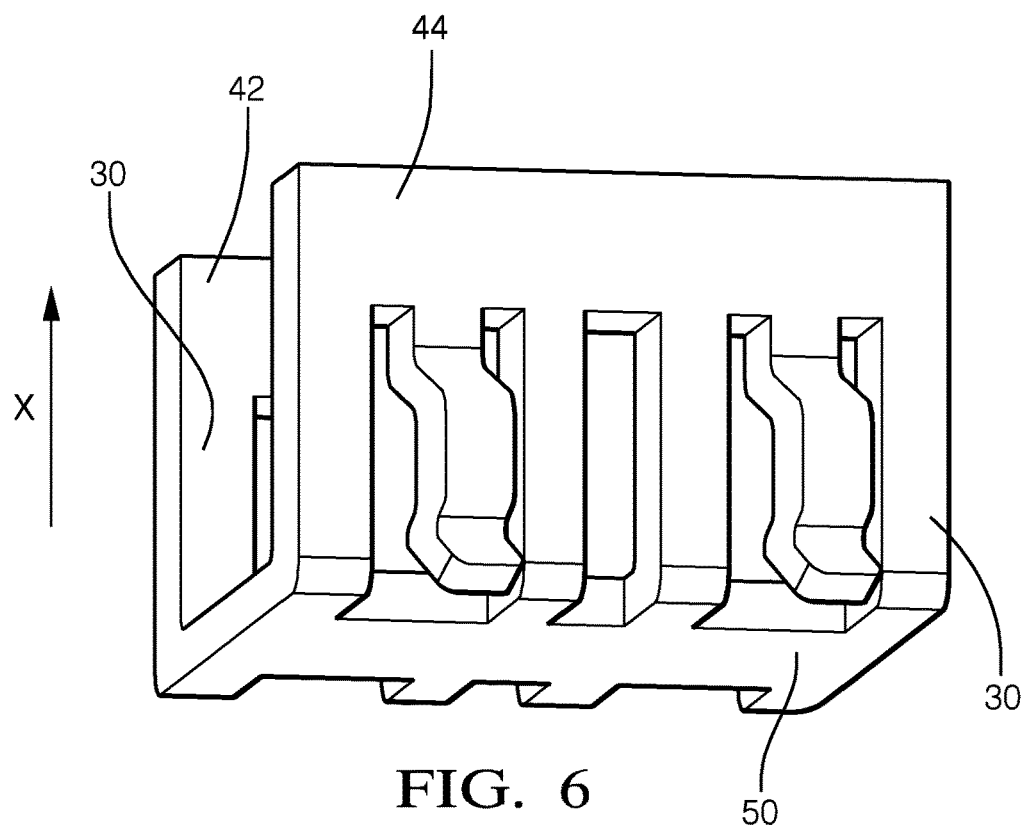
FIG. 6 shows a perspective representation of a first embodiment of a bridge contact element.

FIG. 6 shows a perspective representation of a bridge contact element 50.

Figure 7:
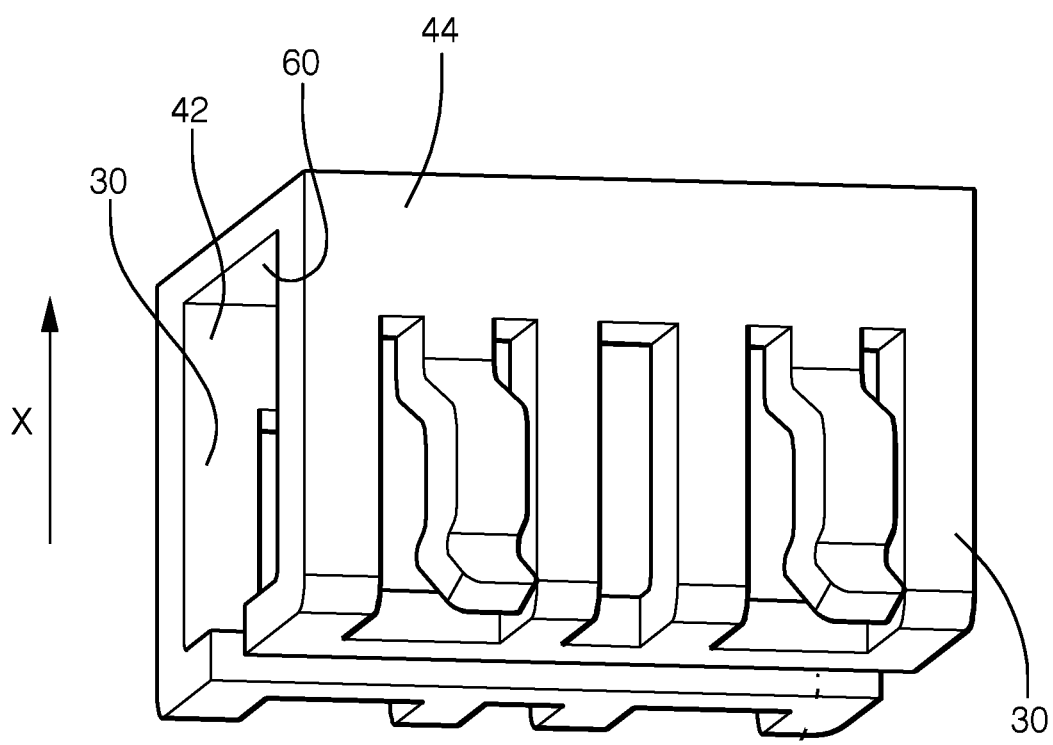
FIG. 7 shows a perspective representation of a second embodiment of a bridge contact element.

FIG. 7 shows a perspective representation of a bridge contact element 60 as shown in FIG. 6. It satisfies the same object, but the connection is located at the oppositely disposed side as in the bridge contact element 50 in the previous representation of FIG. 6 at the other ends of the connector elements 30, which is an alternative embodiment for installation and operation depending on the arrangement and on the demand on tolerance compensation.

Figure 8:
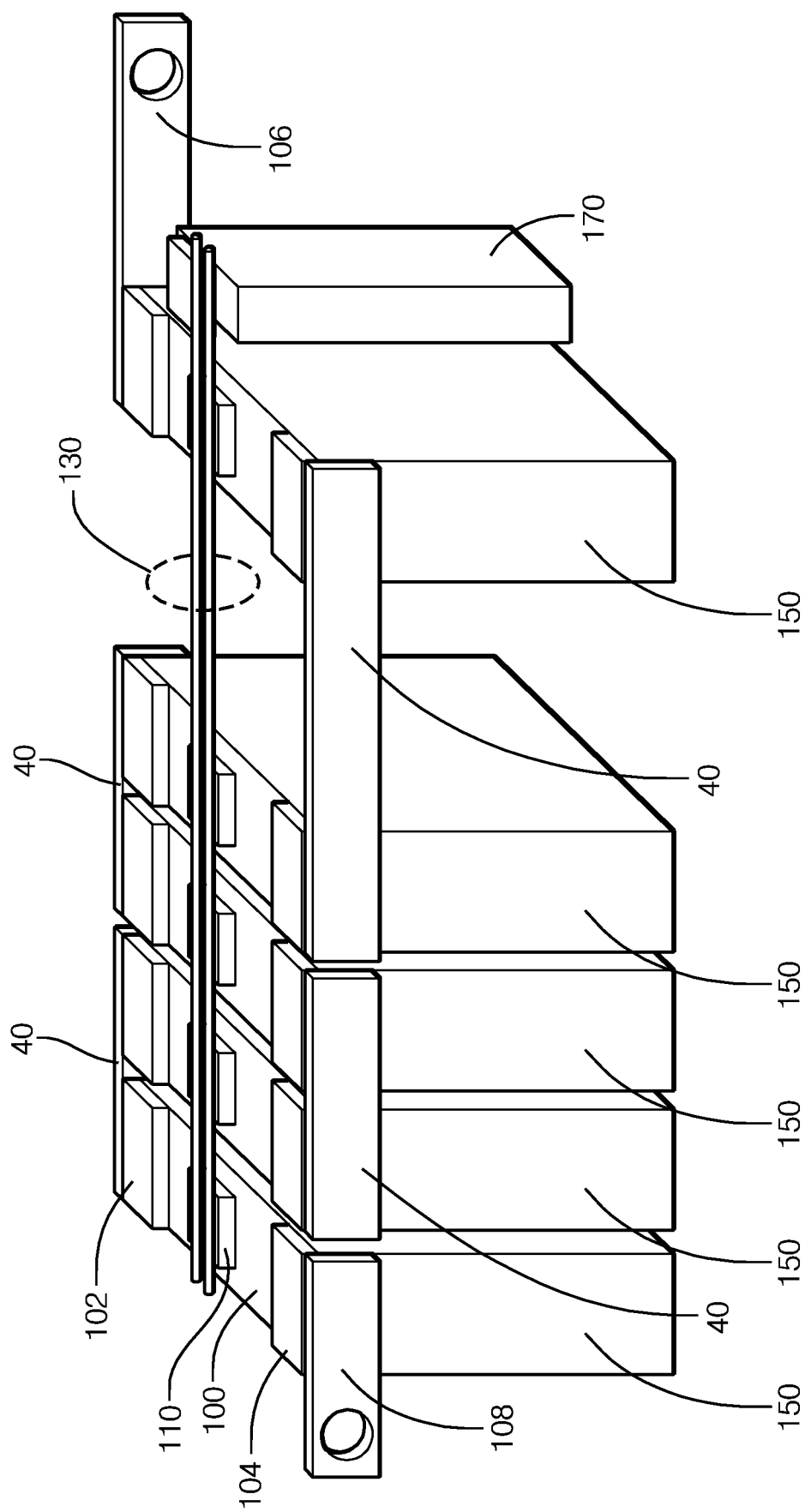
FIG. 8 shows a perspective representation of the battery module.

FIG. 8 shows a perspective representation of a battery module 10. This representation illustrates how the battery cells are electrically connected to one another. The electrical connections otherwise hidden in the module carrier 300 can be observed more simply here. The battery module 10 comprises a plurality of battery cells 100. An electronic battery cell monitoring module 110 is attached to each of the battery cells 100. The battery cell monitoring modules 110 are connected to one another by a balancing bus 130 comprising at least two electrical lines 140, 141 for transmitting data and electrical current. The electronic battery cell monitoring modules 110 are electrically connected to a positive terminal 102 and to a negative terminal 104 of the battery cell 100. The electronic battery cell monitoring module 110 is formed in one part with the battery cell 100, whereby an autonomous battery element 150 is formed. Each battery cell 100 of the battery module 10 is respectively electrically connected at its own positive terminal 102 to a negative terminal 104 of an adjacent battery cell 100. Each battery cell 100 of the battery module 10 is furthermore respectively electrically connected at its own negative terminal 104 to a positive terminal 102 of an adjacent battery cell 100. So that a serial connection of battery cells 100 is produced. There is an exception in the first and last battery cells 100 whose free terminals are provided with a connector terminal 106, 108 to make the battery module 10 connectable to an electrical device.

Figure 9:
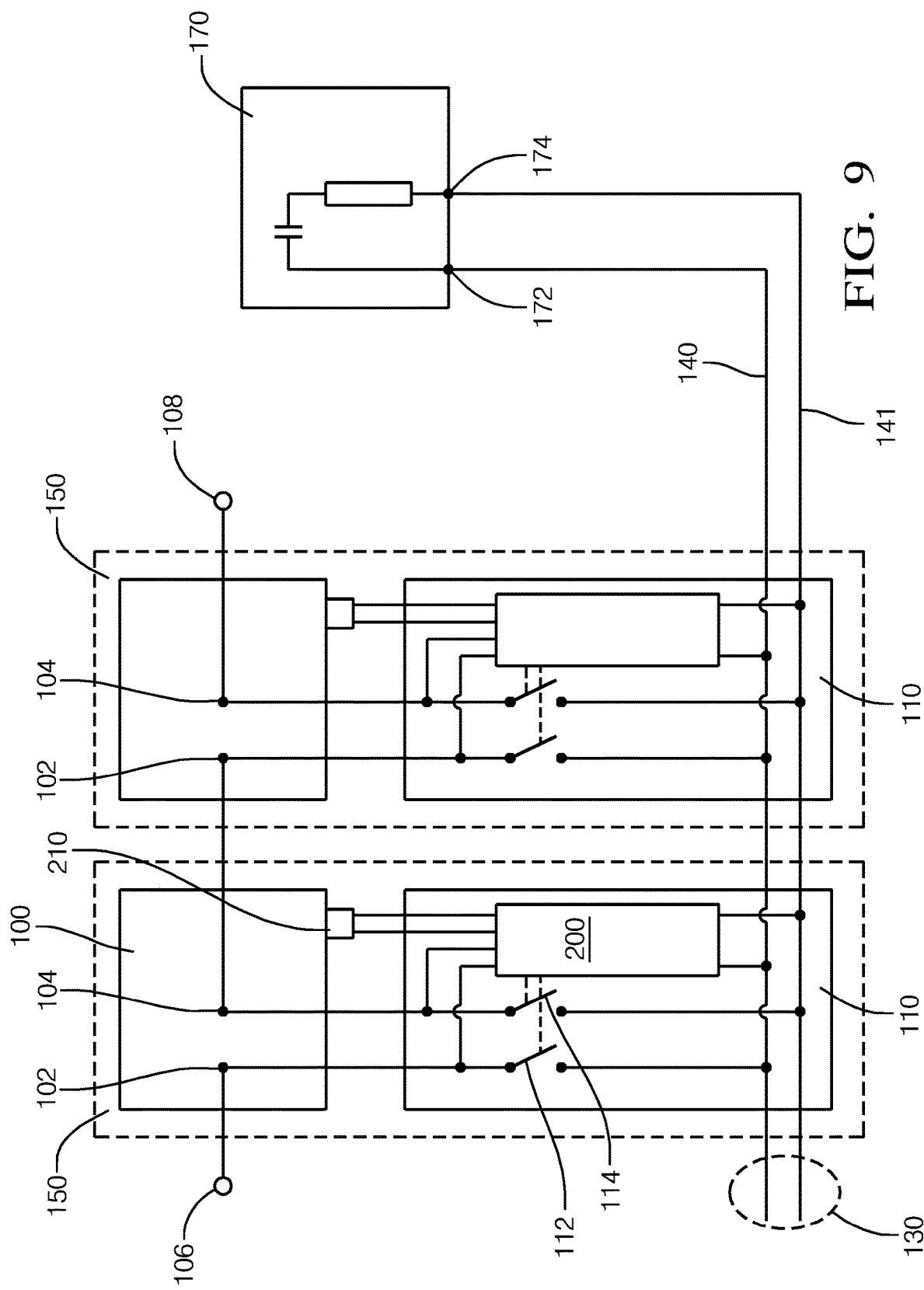
FIG. 9 shows a schematic representation of the battery module.

FIG. 9 shows a schematic representation of a battery module 10. There are only two battery cells by way of example. The electronic battery cell monitoring modules 110 have a first electrical switch 112 and a second electrical switch 114. The electrical switches 112, 114 are configured to electrically connect the battery cells 100 to a respective one of the two electrical lines 140 of the balancing bus 130. The battery module 10 comprises an energy storage module 170 for storing electrical energy. The energy storage module 170 in the representation comprises by way of example a combination of capacitor and coil. An alternative store for electrical energy could, however, also be used. The energy storage module 170 is electrically connected to the two electrical lines 140 of the balancing bus 130 to take up or output electrical energy over them. In the representation, the connectors 172, 174 of the energy storage module 170 are connected to the two electrical lines 140. The electronic battery cell monitoring modules 110 and the energy storage module 170 are connected to one another by the balancing bus 130 and form a cell balancing system. Each of the electronic battery cell monitoring modules 110 can connect the positive terminal 102 of the battery cell 100 by means of the first electrical switch 112 to one of the electrical lines 140 of the balancing bus 130 and the negative terminal 104 of the battery cell 100 by means of the second electrical switch 114 to the other electrical line 141 of the balancing bus 130 independently of the further electronic battery cell monitoring modules 110. Each of the battery cell monitoring modules 110 is programmable and has at least one microprocessor module 200 that comprises a store, input/output ports, temperature measurement means, and voltage measurement means. The electronic battery cell monitoring modules 110 have a basic communication link for communication with the other battery cell monitoring modules 110 by means of the balancing bus 130.

Figure 10:
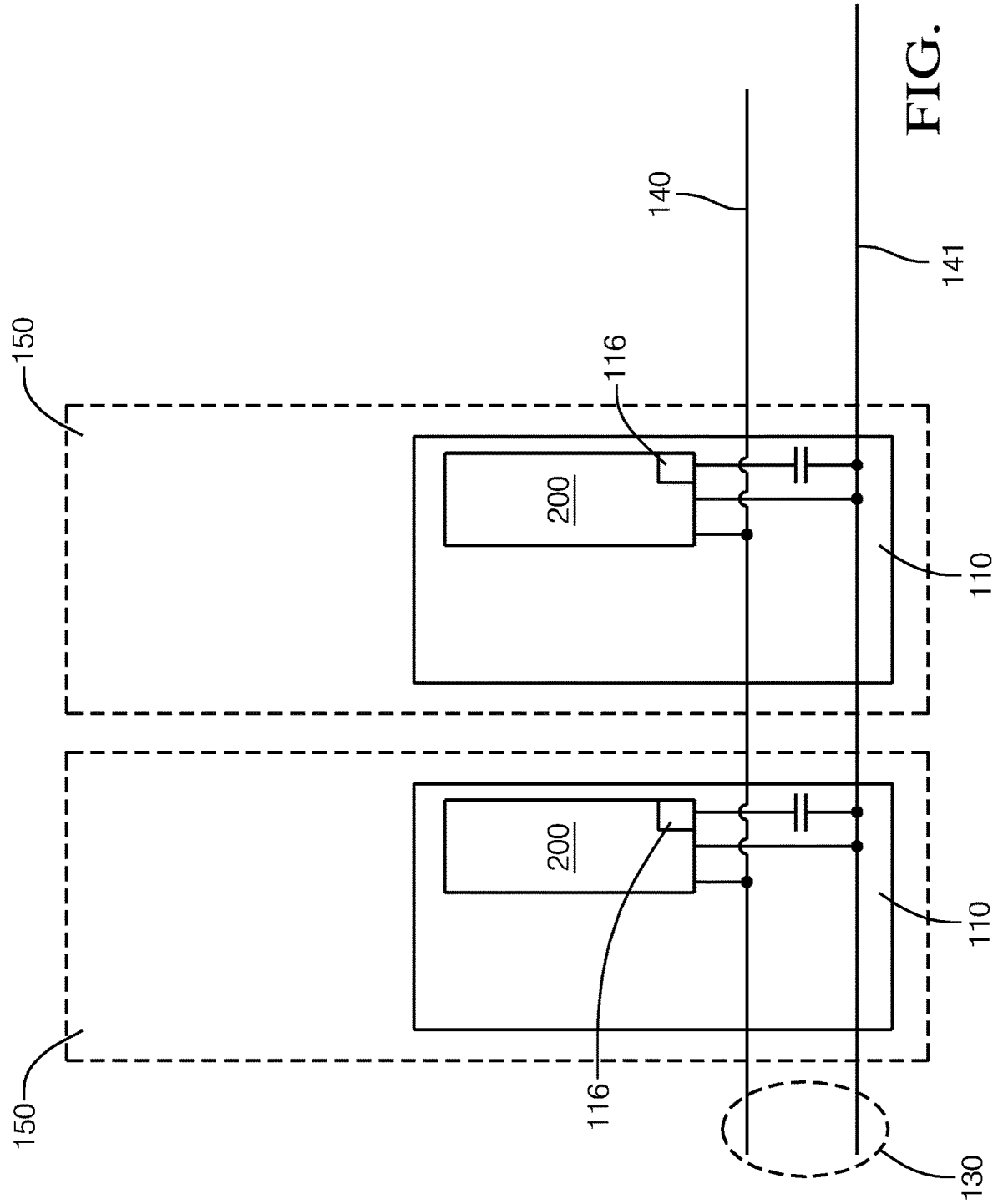
FIG. 10 shows details of the capacitive coupling of the data port in a schematic representation.

FIG. 10 shows details of the capacitive coupling of the data port in a schematic representation. The battery cell monitoring module 110 has at least one electrical data port 116 that is capacitively connected to one of the electrical lines 140, 141 of the balancing bus 130, with control signals being transmitted to the data port 116 by modulation on this electrical line 140, 141.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments, and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

We claim:

1. A battery module for high voltage battery packs, comprising:
   a plurality of battery cells;
   a cell balancing system comprising a respective electronic battery cell monitoring module attached to each battery cell, with each battery cell monitoring module being releasably connected to one another by a first connection means and by a balancing bus configured to transmit data and electrical current, with each electronic battery cell monitoring module being electrically connected to a positive terminal and to a negative terminal of each battery cell; and
   a module carrier configured to receive and hold the plurality of battery cells, with the module carrier comprising second connection means for an electrical connection of the positive terminal of each battery cell to the negative terminal of a first adjacent battery cell and for an electrical connection of the negative terminal of each battery cell to the positive terminal of a second adjacent battery cell, with the module carrier comprising the balancing bus that has at least two electrical lines, with the module carrier comprising an energy storage module for storing electrical energy, and with the energy storage module being electrically connected to the at least two electrical lines of the balancing bus to take up or output electrical energy over them.

2. The battery module in accordance with claim 1, wherein the second connection means comprises an electrical connector element that is produced as a stamped part from a metal sheet and that has at least one freely projecting tongue that is bent out of a metal sheet plane on a first side of the metal sheet and that extends in a plane in parallel with the metal sheet plane, with the connector element having two fingers that freely project in a plug-in direction of the connector element and that extend in parallel with the at least one freely projecting tongue in the metal sheet plane, with the two fingers forming a front end of the connector element in the plug-in direction.

3. The battery module in accordance with claim 2, wherein the second connection means comprises a plurality of terminal contact elements, with a first terminal contact element comprising the electrical connector element and with a contact strip of the metal sheet extending from the two fingers at the front end at a right angle to the plug-in direction against the first side.

4. The battery module in accordance with claim 3 wherein the first terminal contact element is attached to the positive terminal of each battery cell and wherein a second terminal contact element is attached to the negative terminal of each battery cell, with the first and second terminal contact elements being oriented in the plug-in direction.

5. The battery module in accordance with claim 4, further comprising a plurality of bus bars, with each bus bar having a connector element at a first end and having a second connector element at its second end, with the bus bar extending at the right angle to the plug-in direction.

6. The battery module in accordance with claim 5, wherein the module carrier has a plurality of cutouts that are configured to receive and to hold the plurality of battery cells, with each cutout extending from an opening along the plug-in direction, and with the plurality of bus bars being arranged opposite the opening.

7. The battery module in accordance with claim 5, wherein the electrical connector elements of the first and second terminal contact elements and the electrical connector elements of the plurality of bus bars are aligned with respect to one another along a plug-in axis such that they slide into one another and establish electrical contact on a correct alignment of each battery cell on a movement toward one another.

8. The battery module in accordance with claim 5, wherein the electrical connector elements of the first and second terminal contact elements and the electrical connector elements of the plurality of bus bars are aligned with respect to one another along a plug-in axis such that they do not slide into one another and do not establish any electrical contact on an incorrect alignment of each battery cell on a movement toward one another.

9. The battery module in accordance with claim 8, wherein a first terminal contact element attached to a first battery terminal of each battery cell has an extension at the right angle to the plug-in direction that differs from an extension of the second terminal contact element that is attached to a second battery terminal.

10. The battery module in accordance with claim 2, wherein the second connection means comprises a plurality of bridge contact elements, with each bridge contact element comprising two of the electrical connector elements that are arranged in parallel with one another, and with first sides of the electrical connector elements facing in opposite directions, with the electrical connector elements being connected by a piece of the metal sheet.

11. The battery module in accordance with claim 1, wherein the first connection means comprises a self-locating plug-in system to connect each electronic battery cell monitoring module to the balancing bus and to the energy storage module.

12. The battery module in accordance with claim 1, wherein the energy storage module is formed in one part with the module carrier.

13. The battery module in accordance with claim 1, wherein each electronic battery cell monitoring module has a first electrical switch and a second electrical switch, with the first and second electrical switches being configured to electrically connect each battery cell to a respective one of at least two electrical lines of the balancing bus, and with each electronic battery cell monitoring module and the energy storage module being connected to one another by the balancing bus to form the cell balancing system.

14. A method of assembling a battery pack comprising the steps of:
a) providing a plurality of battery cells, with the plurality of battery cells being preselected according to their characteristic data, comprising respectively one electronic battery cell monitoring module attached to each battery cell of the plurality of battery cells, with each electronic battery cell monitoring module being electrically connected to a positive terminal and to a negative terminal of each battery cell, and with each battery cell monitoring module being connectable to one another, releasably by means of first connection means, by a balancing bus for transmitting data and electric current;
b) providing a module carrier configured to receive and hold the plurality of battery cells, with the module carrier comprising second connection means for electrically connecting the positive terminal of each battery cell to the negative terminal of a first adjacent battery cell and for electrically connecting the negative terminal of each battery cell to the positive terminal of a second adjacent battery cell, with the module carrier comprising the balancing bus that has at least two electrical lines, with the module carrier comprising an energy storage module for storing electrical energy, and with the energy storage module being electrically connected to at least two electrical lines of the balancing bus to take up or output electrical energy over them; and
c) plugging the plurality of battery cells into the module carrier, whereby a connection of each battery cell monitoring module to one another and to the energy storage module is established via the balancing bus and the connection of each battery cell to the second connection means.

* * * * *